MULTIPLE OUTPUT CONVOLUTION MULTIPLIER

Filed Feb. 15, 1967 5 Sheets-Sheet 1

INVENTOR
GRANVILLE E. OTT

ATTORNEY

MULTIPLE OUTPUT CONVOLUTION MULTIPLIER

Filed Feb. 15, 1967 5 Sheets-Sheet 2

INVENTOR:
GRANVILLE E. OTT
D. Carl Richards
ATTORNEY

MULTIPLE OUTPUT CONVOLUTION MULTIPLIER

INVENTOR:
GRANVILLE E. OTT
D. Carl Richards
ATTORNEY

INVENTOR
GRANVILLE E. OTT
ATTORNEY

United States Patent Office 3,553,722

Patented Jan. 5, 1971

3,553,722

MULTIPLE OUTPUT CONVOLUTION MULTIPLIER

Granville E. Ott, Houston, Tex., assignor to Texas Instruments Incorporated, Dallas, Tex., a corporation of Delaware Filed Feb. 15, 1967, Ser. No. 616,259
Int. Cl. G06f 7/38
U.S. Cl. 235—156 10 Claims

ABSTRACT OF THE DISCLOSURE

A physical representation of the convolution of two digitally coded electrical time series is formed by concurrently forming digital electrical signals representative of the respective partial products of (i) each of a plurality of words in the first of the two series, and (ii) a like plurality of sets of bits in a sequence of words in the second of the two series where each of the sets of bits has at least one bit common to at least one other set. Thereafter digital signals are formed which are representative of the sums of the partial product digital signals while each digital signal representative of one of the sums is altered in dependence upon the next partial product signal.

This invention relates to digital computing devices and more particularly to a device which performs multiple multiplication and multiple accumulative summations, primarily for concurrently calculating sets of sums of products.

In data handling operations involving the use of digital computers, certain classes of operations involve such repetition of a particular mathematical step as to unduly burden computers constructed and programmed to operate in a conventional mode. The present invention minimizes this burden and is particularly useful for example, in connection with processing the seismic data wherein digital convolution filtering and correlation functions are treated. Digitized seismograms may be represented by a series of digitized bit signals of electrical, magnetic, or other form. Such a series represents earth vibrations detected by seismic detectors following the generation of a seismic disturbance, such as the detonation of an explosive charge. Processing such seismograms often requires the repetitive multiplication and summation of samples of the seismic signal at selected time intervals. For example, many millions of computations are involved in forming the correlation function, $$Y_m=\sum_{n=a}^{b} F_n X_{n+m}$$

and the convolution filter function $$Y_m=\sum_{n=a}^{b} F_n X_{n-m}$$

Simplification of the foregoing operation, repeated so many times, has been found to be highly desirable.

It is an object of the present invention to provide a structure and an operation in a computer which provides high speed multiple multiplication and multiple accumulative addition throughout a series of concurrently occurring calculations. Such an operation is particularly useful and highly desirable to evaluate convolution filter and correlation functions.

More particularly, and in accordance with the present invention, a method and device are provided for performing the operation involved in forming a physical representation of the general expression $$Y_m=\sum_{n=a}^{b} F_n X_{n+m}$$

without intermediate storage of any sum of partial products. The method involves moving sets of digitized data signals through a series of similar multiplier and addition stages. In each stage a partial product is formed and added to the sum of partial products formed at the previous stage. When a signal representing an ultimate sum has been formed, it is then stored.

More particularly there is provided a digital device for multiplying each data word of a first series ($F_n$, $n=a, b$) by a data word of a second series $$\left(X_{n+m,\ n=a,\ b \atop m=c,\ d}\right)$$

to form a third series ($Y_{m,\ m=c,\ d}$. Each data word of the third series represents the general form $$\sum_{n=a}^{b} F_n X_{n+m}$$

This is accomplished without intermediate storage of any partial product signals. More specifically, means are provided for circulating a plurality of data words in a single continuous flow path which path includes a plurality of stages. Each stage represents an electrical operation point at which the data word at that point may be modified. A digital multiplier and a digital adder are associated with each of such stages with the flow path including the adder. The adder is interconnected to the multiplier in each stage, the product formed in each of the multipliers being added to the data word at that stage. Means are provided for introducing the various data words of the first and second series to the multipliers in synchronism with passage of the data words through the stage of the adder in the path whereby the output of a given adder is added to the partially formed data word of the third series at that stage. Finally, an output is provided for extracting the completed data word of the third series from the path.

For a more complete understanding of the present invention and for further objects and advantages thereof, reference may now be had to the following description taken in conjunction with the appended claims and accompanying drawings wherein:

Figure 1:
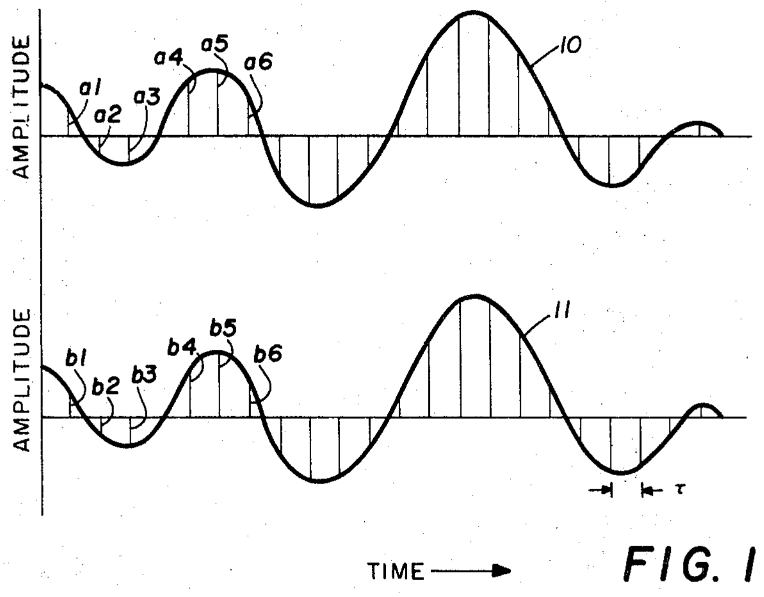
FIG. 1 illustrates two waveforms between which a convolution operation is desired to be performed.
Figure 2:
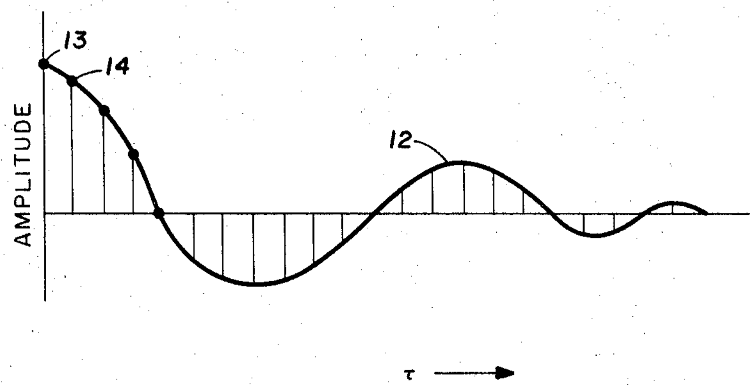
FIG. 2 illustrates a representative convolution function for the two waveforms of FIG. 1.

To illustrate the use of the present invention, reference is had to FIGS. 1 and 2. Consider the problem of generating the physical representation of the correlation function between the two time variable waveforms 10 and 11 shown in FIG. 1. The correlation function, obtained in accordance with the expression:

$$Y_m=\sum_{n=a}^{b} F_n X_{m+n}$$

may thus be obtained by a series of steps which may include as a first step multiplying the sample *a*1 of the waveform 10 by the sample *b*1 of the waveform 11. In the next step, samples *a*2 and *b*2 are multiplied and the product is added to the product of the first operation. In the third step, the samples *a*3 and *b*3 are multiplied and the product is added to the last sum. This sequence of steps is continued for the time samples throughout the length of the signals 10 and 11. Each resultant sum is carried throughout the entire process by multiplying and then adding the product to the previous sums. The final sum then represents one point 13 at $\tau=0$ of the correlation function 12, shown in FIG. 2, wherein amplitude is plotted as a function of $\tau$. The waveforms 10 and 11 are then shifted, one relative to the other, by an increment $\tau$ and the entire series of multiplications and summations is repeated (that is, $(a2\times b1)+(a3\times b2)$, etc.) to evaluate the point 14 on the correlation function 12. This operation is then repeated until the waveforms have been moved relative to each other over their entire lengths in steps of $\tau$, evaluating one point on the correlation function for each series of operations.

The foregoing demonstrates the multiplicity of operations involving the computation of one point of the function $$Y_m=\sum_{n=a}^{b} F_n X_{m+n}$$

It is the simplification of operations of this nature to which the present invention is primarily directed.

Figure 3:
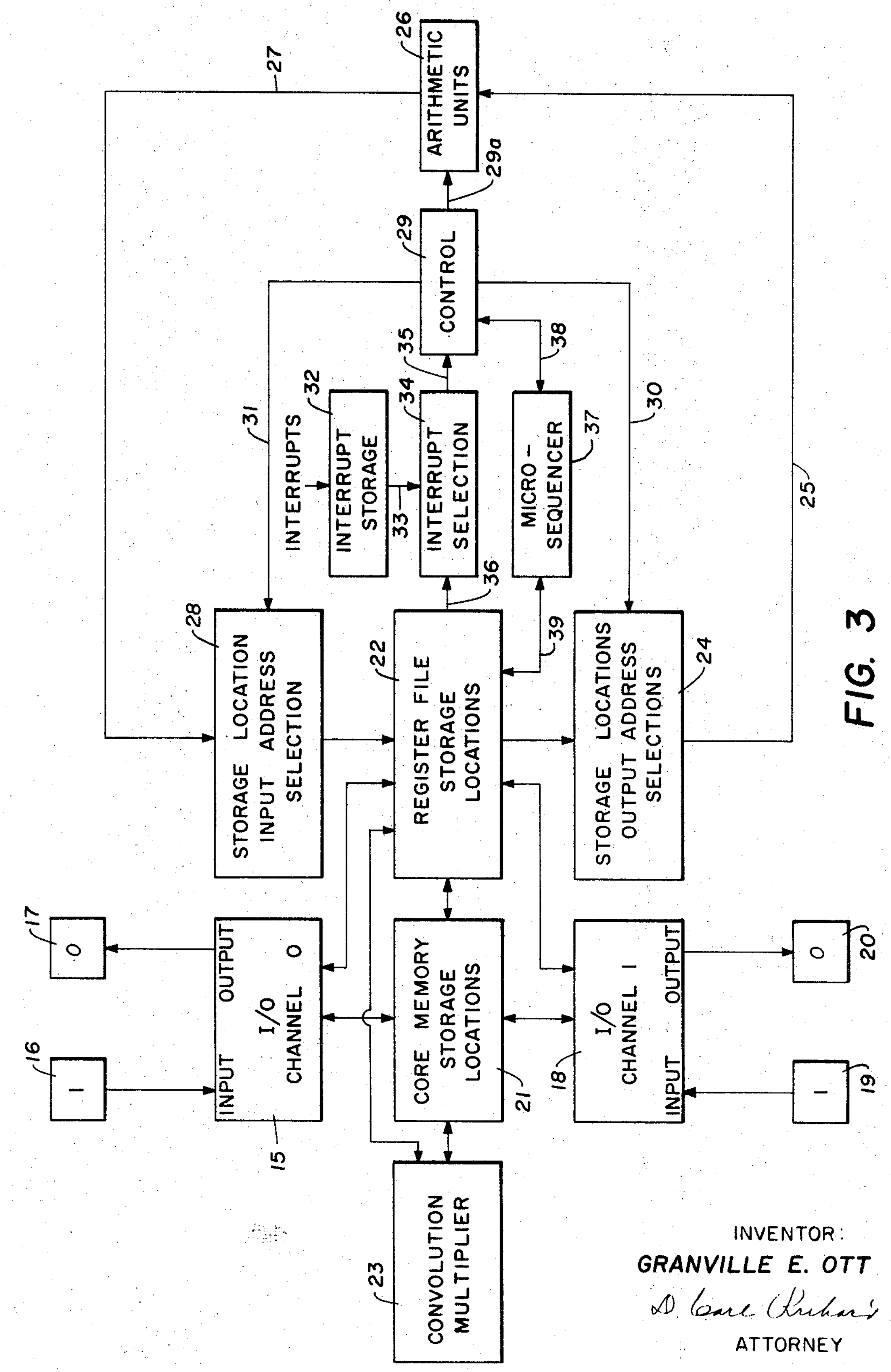
FIG. 3 is a block diagram of a typical data processing system embodying the present invention.

In FIG. 3, a general purpose digital computer embodying the present invention has been shown in block form, and includes a first input-output channel 15 having an input device 16, and an output device 17. A second independent input-output channel 18 is likewise provided with input device 19 and output device 20. A core storage 21 is accessible to both channels 15 and 18 and is also accessible to a register file 22 and to a convolution multiplier 23. Register file 22 also is accessible from the channels 15 and 18 from the convolution multiplier 23. A storage location and output address selector 24 is provided for applying data from the register file 22 by way of channels 25 to arithmetic units 26. The output channels 27 of arithmetic units 26 lead to a storage location input address selector 28. A control unit 29 is coupled directly to the arithmetic units 26 by way of channel 29*a* and to the selectors 24 and 27 by way of channels 30 and 31, respectively.

An interrupt storage unit 32 is coupled by way of channel 33 to an interrupt selector unit 34. The interrupt selector unit 34 is coupled by way of channel 35, to the control unit 29. The register file 22 is coupled to the interrupt selector unit 34 by way of channel 36. A microsequencer 37 is coupled by way of channel 38 to the control unit 29 and to the register file 22 by way of channel 39.

The data processing system illustrated in FIG. 3 has been briefly described in order to provide a setting for the computer components particularly involved in connection with the present invention. The multiplication and summation operations of the present invention are primarily related in the system of FIG. 3 to the convolution multiplier unit 23.

Input data representative of the successive time samples of the waveforms 10 and 11 are stored in the core memory 21 for example, as 24-bit words. Selected words required for evaluation of functions, such as the convolution and/or correlation function above described, are then accessible from memory 21 by the register file 22, and convolution multiplier 23.

The convolution multiplier is a synchronous unit. That is, data is moved from one location, such as a register, accumulator, or the like, to another location only during the occurrence of a clock pulse. It is assumed, therefore, that an external clock pulse generator is gated to each of the device elements, but, for clarity, clock pulse gating circuits and leads have been omitted from the diagrams.

Figure 4:
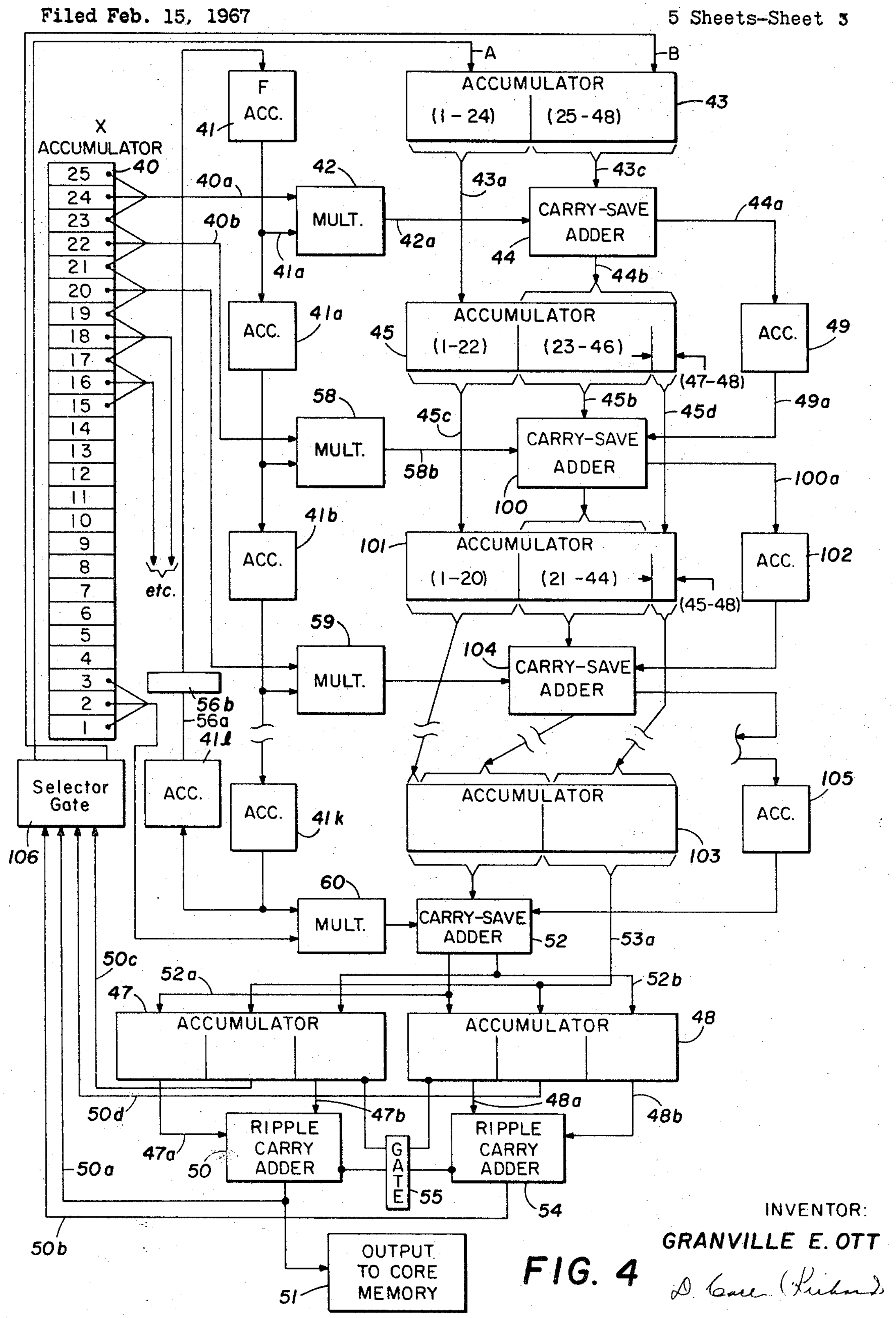
FIG. 4 is a block diagram of the convolution multiplier in accordance with the present invention.

With this explanation of the setting for the present invention, reference should now be had to FIG. 4 in which a block diagram of the present invention is shown. In FIG. 4, 25-bit accumulator 40 is adapted to receive data words transferred thereto from core memory storage locations. The data words which will be transferred into the accumulator 40 are those which represent the successive values of the function X. A second accumulator 41 of 24-bit capacity is provided into which the 24 bits of the words representing the values of the function F will be transferred from core memory locations.

The first three storage locations in the accumulator 40 are connected by way of signal channels represented by channel 40*a* to a multiplier unit 42. All of the bits from accumulator 41 are applied to the multiplier 42 by way of channel 41*a'*, as well as to a second accumulator 41*a*.

Accumulators 41*a*, 41*b*, 41*c* . . . 41*k*, 41*l* are coupled in tandem to form a continuous data flow path. While only four such accumulators have been shown, it is to be understood that for the example herein employed, thirteen such accumulators would be included in the flow path. The output channel 56*a* of accumulator 41*l* circulates F values back to accumulator 41.

The digital signals multiplied in multiplier 42 are conducted by way of signal channel 42*a* to adapted to carry-save adder 44 in a second data flow path. A second input channel leading to the adapted carry-save adder 44 is provided to transfer twenty-four bits from bit positions 24–48 of 48-bit accumulator 43. Two ouput channels 44*b* and 44*a* are provided to respectively conduct the sum and carry values to bit positions 24–48 to 48-bit accumulator 45 and to the carry accumulator 49.

From 48-bit accumulator 43, channel 43*a* leads to 48-bit accumulator 45. These channels conduct the bit positions which were not conducted into the adapted carry-save adder 44, i.e.: bit positions 1–23, into the same positions in 48-bit accumulator 45. From accumulator 45, a similar conduction path arrangement is provided with the carry-save adder inputs from accumulator 45 and output to accumulator 101 moved left two bits. The twenty-four bits in positions 22–46 of 48-bit accumulator 45 are conducted into adapted carry-save adder 100 by way of channels 45*b*. The remaining bit positions 1–21 and 47–48 of accumulator 45 are conducted by way of bit channels 45*c* and 45*d* into the same bit locations in 45-bit accumulator 101. Each successive carry-save adder is moved to the left two bit positions.

Bit positions 21–23 of accumulator 40 are conducted into multiplier box 58 by channel 40*b*, and there multiplied by the 24-bit value of the function F contained in accumulator 41*a*. The ouput of multiplier 58 is conducted by channel 58*b* into the adapted carry-save adder 100. Also, conducted into adder 100 by channel 49*a* is the carry value contained in carry-accumulator 49. The sum output of adapted carry-save adder 100 is conducted into bit positions 20–44 of 48-bit accumulator 101, and the carry value is conducted by channel 100*a* to carry accumulator 102.

It will be seen that the 48-bit accumulators 43, 45, 101 . . . 103 and adapted carry-save adders 44, 100, 104 . . . 52 with associated carry-value accumulators 49, 102 . . . 105 are alternately connected and coupled in tandem to form a second continuous data flow path. The stages of the first and second flow paths are each interconnected by a partial multiplier having one input from an accumulator in the first path and a second input from three positions of accumulator 40.

At the last stage of the convolution multiplier, two accumulators 47 and 48 are provided to alternately receive the partially formed correlation products. Flip-flop gate 55 determines when each accumulator receives a value. The sum value formed in adapted carry-save adder 52 is conducted by channels 52*a* into the first third of one or othe other of accumulators 47 and 48, and the carry value is conducted by channels 52*b* into the last third of one or the other of accumulators 47 and 48. The last 24 bits contained in 48-bit accumulator 103 are conducted by channels 53*a* into the middle third of one or the other of accumulators 47 and 48.

A ripple-carry adder 50 is connected at its inputs by data channels 47*a* and 47*b* to the first and last thirds of accumulator 47. In this adder the carry value stored in accumulator 47 is added to the partial product in the first third. Likewise, ripple-carry added 54 is connected by input channels 48*a* and 48*b* leading from the first and last thirds of accumulator 48. The action of ripple-carry adders 50 and 54 are also controlled by flip-flop gate 55 so that adders 50 and 54 alternately add the carry values to the partial product contained in the first third of its associated accumulator.

The sums formed in ripple-carry adders 50 and 54 are conducted by channels 50*a* and 50*b* into selector gate 106. By channels 50*c* and 50*d* the values contained in the middle third of accumulators 47 and 48 also are conducted to selector gate 106. From selector gate 106 channels are provided as indicated to return words to positions A and B of 48-bit accumulator 43. Output channel 51 is provided by which words representing the correlation of two functions are conducted to core memory after completing the required multiply and add cycles through the system.

The operation of the system of FIG. 4 will now be described in terms of the following example. The correlation between a first series of twelve 24-bit word signals representing the digitized function, $F_n$, and a second series of 24-bit word signals representing the digitized function, $X_{n+m}$, to obtain signals representing a third digitized function, $Y_m$.

The convolution multiplier simultaneously forms a partial product in each stage as data is moved through it; hence, if twelve multiply-add stages are employed, twelve values of $Y_m$ (for example $Y_1, Y_2 \ldots Y_{12}$) can be simultaneously processed. For convenience, the following description will employ the term "values" which shall be taken to mean a physical representation, as by a plurality of electrical bits of a given signal or function.

At the beginning of the process, the first 24-bit X value, $X_0$, is transferred from the core memory into the accumulator 40 as a multiplier, two bits at a time. The first bit position (25) in accumulator 40 is always zero for reasons hereinafter explained. Thus the first two bits of $X_0$ will be transferred into the second and third bit positions (23–24) in accumulator 40. The first 24-bit F value, $F_0$, is also transferred in its entirely into accumulator 41 as a multiplicand. As $F_0$ is moved through the multiplier, it is multiplied at each stage by three bits of $X_0$. That product, shifted to the proper binary location, is added to the previous products as in regular multiplication, so that at the last stage of the multiplier, the output value of $F_0X_0$, forms the first term in $Y_0$. The $X_0$ value is then replaced by the next 24-bit X value, $X_1$, two bits at a time. $F_0$ is circulated to the top stage of the multiplier delayed one clock interval by accumulator 41*l*, but the product $F_0X_0$ is delayed two clock intervals at the last stage until after the first partial product, $F_0$ multiplied by the first three bits of $X_1$, is completed. As $F_0$ and the partial product are moved to the second stage, the $F_0X_0$ product is circulated to the first stage, and the second F value, $F_1$, is brought into the first stage multiplier 42. Thereafter, $F_1$ is multiplied two bits at a time by $X_1$ and the partial products formed are added to the previously formed product $F_0X_0$. At the bottom stage, then, $F_0X_1$, the first term in $Y_1$, is completed. During the next clock interval, $F_0X_0+F_1X_1$, the first two terms of $Y_0$, are completed. This process is continued until the ultimate sums, $Y_0$, $Y_1$, $Y_2$, $Y_m$, shown in Table 1, are produced.

It must be understood that data is moved from stage to stage in discrete groups. Each partially formed $Y_m$ value and all uncombined values associated with it, such as carry and function values, in the same stage are all moved simultaneously to the next stage. Also, to be emphasized is that there are a plurality of partially formed $Y_m$ values concurrently circulating in the multiplier. The enclosed groups in Table 1 indicate the groups in which the data is processed as it circulates through the multiplier.

It can be seen that in this example up to thirteen $Y_m$ values can be simultaneously processed. More specifically, two bits of an X value, $X_0$, for example, are transferred from core memory into positions 2 and 3 of the 25-bit accumulator 40. Simultaneously, the entire first 24-bit F value, $F_0$, is transferred from core memory into accumulator 41. Next, the bits in the first three positions of accumulator 40 (the zero in position 1 and the first two bits of $X_0$ in positions 2 and 3) and the contents of accumulator 41, the 24-bits $F_0$ value, are gated into a partial multiplier 42 which multiplies the two together. This partial product is then added to the bits contained in positions 22–46 of accumulator 43. This addition is effected by the adapted carry-save adder 44, which, unlike the conventional binary carry-save adders, forms only one sum and one carry value, the carry value being stored in accumulator 49. The sum is then moved into bit positions 22–46 of accumulator 45. All untreated bits of accumulator 43 (the bits in positions 1–21 and 47–48) are transferred directly to accumulator 45 in their same positions. At the same time, the $F_0$ value in accumulator 41 is moved to accumulator 41*a* there to be multiplied by the next two bits and the last used bit of $X_0$. After this multiplication, the partial product is added in carry-save adder 100 to position 20–44 of accumulator 45, (the first partial product shifted right two positions) and to the carry value in accumulator 49 from the carry value of carry-save adder 44, the carry value in accumulator 49 being shifted to maintain its proper binary location.

This moving, multiplication, and addition of partial products is continued until the entire product $F_0X_0$ is formed in ripple-carry adder 50 or 54 alternately. Two clock intervals are required for a ripple-carry addition whereas only one is required for carry-save add step. If faster logic is used for the ripple-carry adder, adder 54 will be removed, reducing the operation to thirteen steps with twelve $Y_m$ values. Accumulator 41*l* would also be removed. The product $F_0X_0$, however, is delayed one stage behind $F_0$ by temporarily storing its value in one of the combination of accumulators 47 and 48 so that as $F_0$ is circulated through storage locations in accumulator 41*e* to accumulator 41, the $F_0X_0$ value is held back. As $F_0$ is circulated to accumulator 41, two bits of the next X value, $X_1$, are transferred into positions 2 and 3 of accumulator 40. Thereafter, each time $F_0$ is transferred from one accumulator to the next in accumulator chain 41, 41*a*, 41*b* . . . 41*l*, two bits of the next X value are transferred into the locations of accumulator 40 which are gated into the multiplier associated with the stage preceding the stage at which $F_0$ is located. Also, since the $F_0$ value appears at the beginning of the list of partial products forming values of Y shown in Table 1, it is necessary to set the contents of accumulator 43 to zero each time the $F_0$ value is transferred into 24-bit accumulator 41. This occurs at the beginning of the formation of a new Y value.

$F_0$ is, as before, multiplied by the first three bits of accumulator 40, now containing two bits of $X_1$, in multiplier 42 and added in carry-save adder 44 to positions 24–48 of accumulator 43. The resultant sum is stored in positions 22–46 of accumulator 45. As this sum is stored, $F_0$ is moved to accumulator 41*a*, and $F_1$ is transferred from core memory into accumulator 41. Then the delayed product $F_0X_0$ is brought into accumulator 43. At this point, $F_1$ is multiplied in multiplier 42 by the first three bits of accumulator 40 containing the first two-bit values of $X_1$. As $F_0$ continues to circulate, it is multiplied by $X_1$ forming product $F_0X_1$. $F_1$, circulating in behind the $F_0$ value, is similarly multiplied by $X_1$. The product is added to the accumulator contents forming the product-sum $F_0X_0+F_1X_1$.

When $F_0X_1$, the first term in $Y_1$, and $F_0X_0+F_1X_1$, the first two terms of $Y_0$, are completed, $X_2$ is similarly transferred from core memory two bits at a time into the successive positions in accumulator 40 connected to the multiplier stage preceding the $F_0$ value. $F_2$ is then transferred into accumulator 41 sequentially behind $F_0$ and

TABLE I $$Y_0 = F_0X_0 + F_1X_1 + F_2X_2 + F_3X_3 + F_4X_4 + F_5X_5 + F_6X_6 + F_7X_7 + F_8X_8 + F_9X_9 + F_{10}X_{10} + F_{11}X_{11}$$
$$Y_1 = F_0X_1 + F_1X_2 + F_2X_3 + F_3X_4 + F_4X_5 + F_5X_6 + F_6X_7 + F_7X_8 + F_8X_9 + F_9X_{10} + F_{10}X_{11} + F_{11}X_{12}$$
$$Y_2 = F_0X_2 + F_1X_3 + F_2X_4 + F_3X_5 + F_4X_6 + F_5X_7 + F_6X_8 + F_7X_9 + F_8X_{10} + F_9X_{11} + F_{10}X_{12} + F_{11}X_{13}$$
$$Y_3 = F_0X_3 + F_1X_4 + F_2X_5 + F_3X_6 + F_4X_7 + F_5X_8 + F_6X_9 + F_7X_{10} + F_8X_{11} + F_9X_{12} + F_{10}X_{13} + F_{11}X_{14}$$
$$Y_4 = F_0X_4 + F_1X_5 + F_2X_6 + F_3X_7 + F_4X_8 + F_5X_9 + F_6X_{10} + F_7X_{11} + F_8X_{12} + F_9X_{13} + F_{10}X_{14} + F_{11}X_{15}$$
$$Y_5 = F_0X_5 + F_1X_6 + F_2X_7 + F_3X_8 + F_4X_9 + F_5X_{10} + F_6X_{11} + F_7X_{12} + F_8X_{13} + F_9X_{14} + F_{10}X_{15} + F_{11}X_{16}$$
$$Y_6 = F_0X_6 + F_1X_7 + F_2X_8 + F_3X_9 + F_4X_{10} + F_5X_{11} + F_6X_{12} + F_7X_{13} + F_8X_{14} + F_9X_{15} + F_{10}X_{16} + F_{11}X_{17}$$
$$Y_7 = F_0X_7 + F_1X_8 + F_2X_9 + F_3X_{10} + F_4X_{11} + F_5X_{12} + F_6X_{13} + F_7X_{14} + F_8X_{15} + F_9X_{16} + F_{10}X_{17} + F_{11}X_{18}$$
$$Y_8 = F_0X_8 + F_1X_9 + F_2X_{10} + F_3X_{11} + F_4X_{12} + F_5X_{13} + F_6X_{14} + F_7X_{15} + F_8X_{16} + F_9X_{17} + F_{10}X_{18} + F_{11}X_{19}$$
$$Y_9 = F_0X_9 + F_1X_{10} + F_2X_{11} + F_3X_{12} + F_4X_{13} + F_5X_{14} + F_6X_{15} + F_7X_{16} + F_8X_{17} + F_9X_{18} + F_{10}X_{19} + F_{11}X_{20}$$
$$Y_{10} = F_0X_{10} + F_1X_{11} + F_2X_{12} + F_3X_{13} + F_4X_{14} + F_5X_{15} + F_6X_{16} + F_7X_{17} + F_8X_{18} + F_9X_{19} + F_{10}X_{20} + F_{11}X_{21}$$
$$Y_{11} = F_0X_{11} + F_1X_{12} + F_2X_{13} + F_3X_{14} + F_4X_{15} + F_5X_{16} + F_6X_{17} + F_7X_{18} + F_8X_{19} + F_9X_{20} + F_{10}X_{21} + F_{11}X_{22}$$
$$Y_{12} = F_0X_{12} + F_1X_{13} + F_2X_{14} + F_3X_{15} + F_4X_{16} + F_5X_{17} + F_6X_{18} + F_7X_{19} + F_8X_{20} + F_9X_{21} + F_{10}X_{22} + F_{11}X_{23}$$
$$Y_{13} = F_0X_{13} + F_1X_{14} + F_2X_{15} + F_3X_{16} + F_4X_{17} + F_5X_{18} + F_6X_{19} + F_7X_{20} + F_8X_{21} + F_9X_{22} + F_{10}X_{23} + F_{11}X_{24}$$
$$Y_{14} = F_0X_{14} + F_1X_{15} + F_2X_{16} + F_3X_{17} + F_4X_{18} + F_5X_{19} + F_6X_{20} + F_7X_{21} + F_8X_{22} + F_9X_{23} + F_{10}X_{24} + F_{11}X_{25}$$
$$Y_{15} = F_0X_{15} + F_1X_{16} + F_2X_{17} + F_3X_{18} + F_4X_{19} + F_5X_{20} + F_6X_{21} + F_7X_{22} + F_8X_{23} + F_9X_{24} + F_{10}X_{25} + F_{11}X_{26}$$

$F_1$. This cycling process is continued until all F values are circulating in the accumulator loops 41, 41*a*, 41*b* . . . 41*l*. Then all the F values are circulated until all the $Y_m$ values, a few of which are shown in Table 1, are obtained. The $Y_m$ values as they are formed are then taken from output 51 and storied in core memory.

Storage locations 106 and 56*b* represent registers which maintain the relative positions of the values therein and sequentially advance them to the top of the multiplier. In so doing, the number of F values used need not be limited to the number of stages, twelve in this example, as would be true if these storage elements were not present.

The delay accumulators 47 and 48, are each sufficiently large to accommodate the 24-bit sum from carry-save adder 52, the 24-bit value from positions 24–48 of accumulator 43 and the carry value from carry-save adder 52. Each of these accumulators is shown as divided into three sections, the first section containing the most significant bits, the second section the least significant bits, and the third section the carry value. Before the value contained in either accumulator 47 or 48 is circulated to the top stage, the carry value in the third accumulator section is added to the value in the accumulator in the proper binary position by a ripple-carry adder 50 or 54 associated with accumulator 47 or 48, respectively.

The alternate accumulator circulation is effected by a gate 55, such as a flip-flop gating network, which places one accumulator-ripple-carry adder combination in the "receive" path and the other in the "send" path, and reversing to accommodate the next value.

Figure 5:
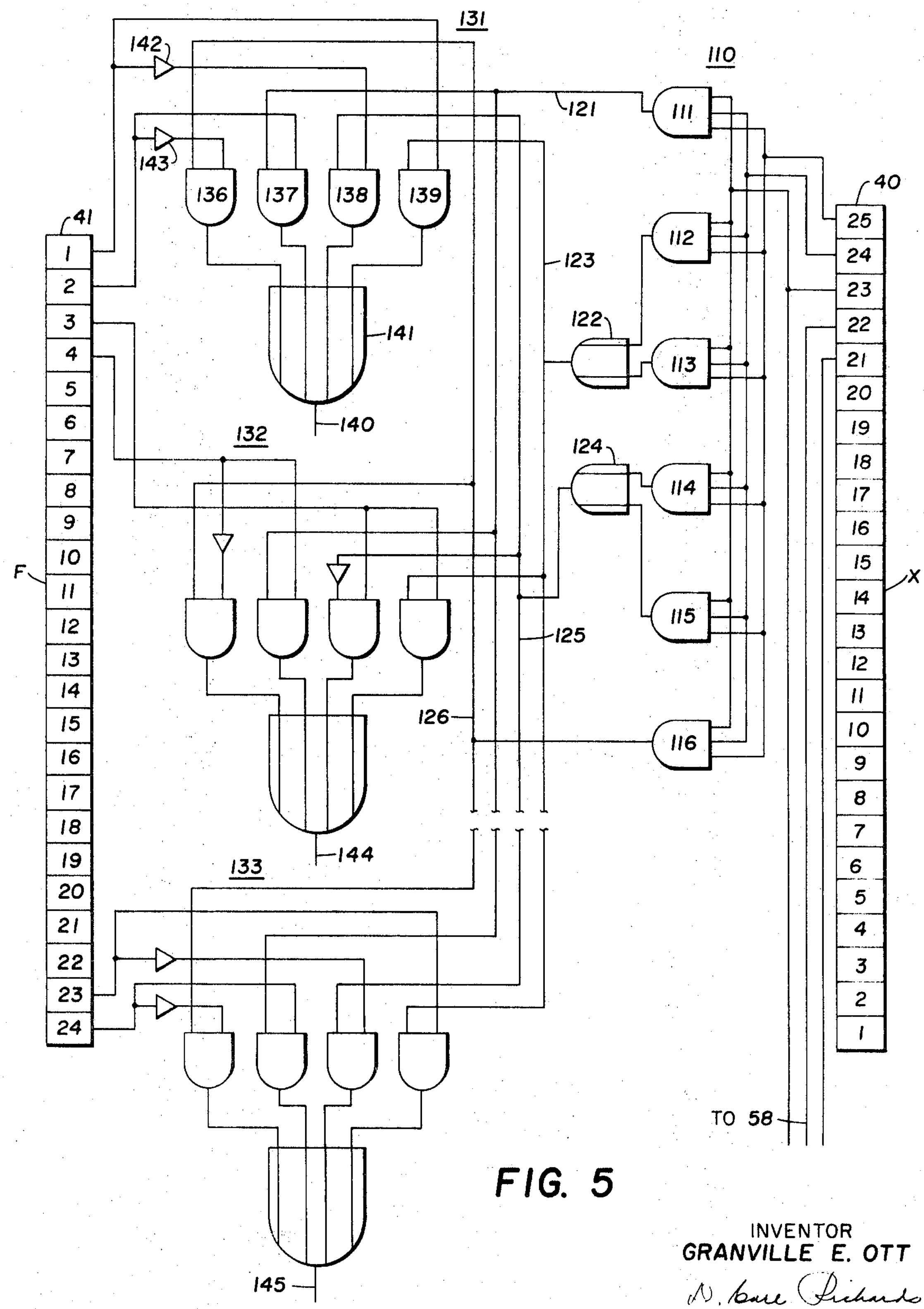
FIG. 5 is a logic diagram of the multiplier-coder.

Referring now to FIG. 5, the partial multiplier circuit used in each partial multiplier 42, 58, 59 . . . 60, is shown. The partial multiplier is a "three bit look ahead, two bit shift" logic circuit, that is a circuit which brings three successive bits of the multiplier (an X value) into each partial multiplier, but repeats the last bit used in the previous partial multiplier. For example, bits from positions 25, 24, and 23 of accumulator 40 are brought into partial multiplier 42, bits from positions 23, 22, and 21 into partial multiplier 58, bits from positions 21, 20, and 19 into partial multiplier 59, and so forth. Because every other bit is repeated in two multipliers (except the first bit) bit position 25 is defined as zero, to eliminate the error caused by a non-correcting redundant value. In this manner, the multiplier using three bits to multiply, uses the redundant bit as a corrective factor. Therefore, the output of the partial multiplier represents a self-correcting product, which, if taken by itself and ignoring products formed in the other multipliers, would be incorrect.

Accumulator 40 is shown on the right hand side having bit positions 1–25. The F accumulator 41 is shown on the left hand side of FIG. 5 having bit positions 1–24. The bits from positions 23–25 of accumulator 40 are applied to each of six AND gates 111–116 of unit 110. The output of AND gate 111 appears on line 121. Outputs from AND gates 112 and 113 are applied by way of an OR gate 122 to line 123. Similarly, the outputs of AND gates 114 and 115 are applied by OR gate 124 to line 125. The output of AND gate 116 appears on line 126. Lines 121, 123, 125 and 126 are connected to twelve identical units, only three of which, units 131, 132 and 133, are shown in FIG. 5. More particularly, unit 131 includes four AND gates 136–139. The outputs of the AND gates 136–139 are all applied to an output line 140 by way of an OR gate 141. Line 121 leads to one input of AND gate 17. Line 123 leads to one input of AND gate 139. Line 125 leads to one input of AND gate 138, and line 126 leads to one input of AND gate 136.

The second input of AND gate 139 is supplied by the bit in position 1 of accumulator 41 with the complement thereof being applied by way of inverter 142 to the second input of AND gate 137. Line 123 leads to one input of AND gate 137 is supplied by the bit in position 2 of accumulator 41 with the complement being supplied by way of inverter 143 to the second input of AND gate 136.

Lines 121, 123, 125 and 126 are connected to units corresponding with AND gates 136–139 in each of units 132 and 133. However, unit 132 is supplied with the bits in positions 3 and 4 from accumulator 41. The bits in positions 5–22 are supplied to like units (not shown) but which would be located between units 132 and 133. The bits in positions 23 and 24 of accumulator 41 are supplied to the AND gates in the unit 133. Gates 132 and 133 produce output states on lines 144 and 145.

As above described, an F value is stored in accumulator 41 and the bits of an X value are stored in accumulator 40. The bits of the X value are taken three at a time, designated by letters *a*, *b* and *c* and weighted by units 110 according to Table 2. All possible combinations of binary values of bits *a*, *b*, and *c* are employed. Column *a* of Table 2 is assigned the value of −2. Columns *b* and *c* each are assigned to the value of +1. These values are multiplied by the values in each column, and the columns are horizontally summed to obtain the weight W.

TABLE 2

| Bits | | | |
|---|---|---|---|
| a | b | c | W |
| 0 | 0 | 0 | 0 |
| 1 | 0 | 0 | −2 |
| 0 | 1 | 0 | 1 |
| 1 | 1 | 0 | −1 |
| 0 | 0 | 1 | 1 |
| 1 | 0 | 1 | −1 |
| 0 | 1 | 1 | 2 |
| 1 | 1 | 1 | 0 |

NOTE.—a, b, c= {25, 24, 23; 23, 22, 21; 21, 20, 19; etc.}

Column W, of Table 2, therefore, represents the weight to be associated with the set of three binary numbers, *a*, *b*, and *c*. In binary logic, a weight, equals "1" can represent a number, "—1" its complement, "2" the number to the second power. In this manner, the sets of numbers *a*, *b*, and *c* are coded with a number of redundancies, that is, if *a*, *b*, and *c* equal respectively 010 or 001, the combination is represented by the redundant W value of 1. However, because the bits are taken in with sets of three bits, two bits of each set common to two different sets, the coding system corrects errors introduced by the redundant values when the values are added together. The advantage of this coding system is that it reduces the number of multiplications by half since one output effectively represents a multiplication by two numbers.

Accordingly, the first three bits, positions 23, 24 and 25 of accumulator 40, of $X_0$ are brought from accumulator 40 into a first gating network 110. This first network is arranged such that the particular gate which has impressed upon it one condition shown in Table 2 (such as 000, 001, or 010 ) emits a one (1), all other gates emit a zero (0). The F value, such as $F_0$, is brought into the second gating network having units 131, 132 . . . 133 therein, also composed of AND and OR gates. For each two bits of the F value, four AND gates in units 131–133 provide the logic to repesent the number, the complement of the number, the number shifted left one place. (to the second power), and the complement of the number shifted left one place.

The outputs of gating network 110 are conducted into the appropriate AND gates of gating networks 131–133 in accordance with Table 2, and outputs are obtained on lines 140, 144 . . . 145, representing $F_0$ times the first three bits of $X_0$ and a corrective factor (zero in the case shown).

In like manner, the last bit previously used in the first multiplication, is the bit in position 23 of accumulator 40, and the next two bits of $X_0$, the bits in positions 22 and 24 of accumulator 40, are conducted into a similar circuit to obtain a partial product representing $F_0$ times bits 21 and 22 of $X_0$ and a corrective factor. By summing all such partial products in the circuit of FIG. 4 above described, the product $F_0X_0$ is formed.

Figure 6:
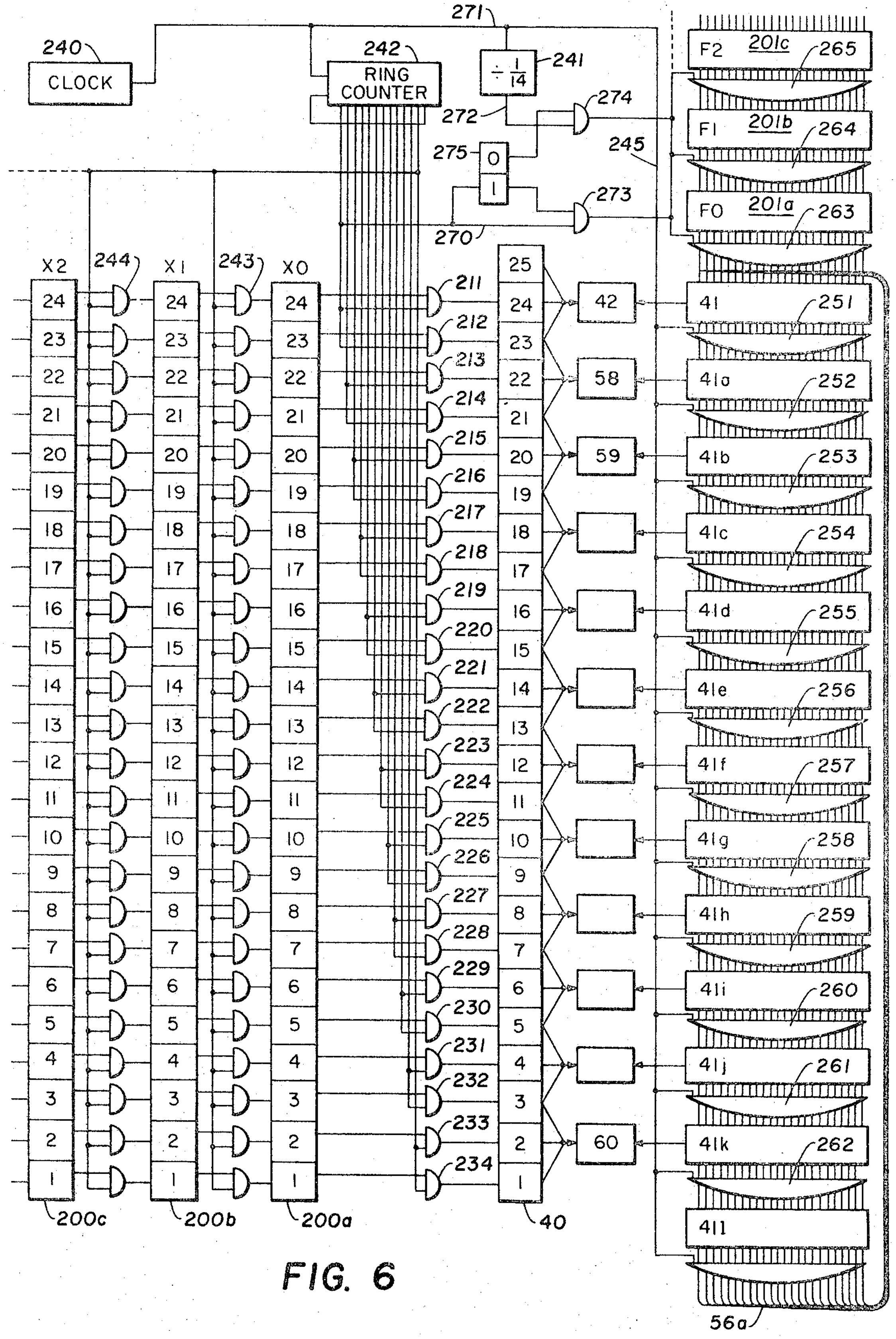
FIG. 6 is a block diagram of a clock transfer system for the convolution multiplier shown in FIG. 4.

In FIG. 6, a portion of the system of FIG. 4 has been shown together with a representative form of data flow control to further illustrate the flow of data through the multiplier. For the purpose of this description, it will be assumed that successive values $X_0$, $X_1$ and $X_2$ . . . $X_n$ are initially stored in retrievable form such as in registers 200*a*, 200*b*, 200*c* . . . 200*n*, respectively. Similarly, the F words will be stored in retrievable form in registers 201*a*, 201*b*, 201*c* . . . 201*n*, respectively.

The bit positions in the storage register 200*a* are connected to the bit positions in the X register 40 by way of AND gates 211–234. The AND gates 211–234 are controlled by pulses derived from a clock source 230. The clock pulses 240 are applied to a pulse divider 241 which divides the clock pulse rate by a factor of 14 and to a 13 bit ring counter pulse delay unit 242. The first 12 outputs from the unit 242 are applied to the AND gates 211–234, taken in pairs. More particularly, the output No. 1 is applied to gates 211 and 212. Output No. 2 is applied to gates 213 and 214. This sequence is continued such that the 12th output is applied to gates 233 and 234. The 13th output is not required for the transfer into accumulator 40. It corresponds to the ripple-carry adder delay.

Thus, in response to the output pulses from the counter 242, the bits 23 and 24 will be transferred into positions 23 and 24 of the accumulator 40 coincident with the first pulse from counter 242. The bits 21 and 22 will be transferred to positions 21 and 22 of accumulator 40 upon the second pulse from the counter 242, etc.

It will be noted that the 12th output from the unit 242 is supplied not only to the gates 233 and 234, but also to the set of gates 243 and 244. Thus as the last bits of the word $X_0$ are transferred into the accumulator 40, the words $X_1$ and $X_2$, and successive words in the order, are advanced one step toward accumulator 40 such that word $X_1$ now occupies the register 200*a* and word $X_2$ now occupies register 200*b*.

Under the control of the counter 242, the words from the register 200 are thus transferred into the accumulator 40 two bits at a time.

With the word $F_0$, $F_1$ and $F_2$ stored in registers 201*a*, 201*b* and 201*c*, it will be seen that they may be transferred downward through the series of registers 41–41*k* under the control of pulses applied by way of line 245. More particularly, AND gates 251–262 are connected to the outputs of accumulators 41*a*–41*k*, respectively, connecting the latter accumulators in cascade. The gates are parallel gates adapted to transfer each of the 24-bit words as a whole from one accumulator to another. Similarly, it will be noted that gate 263 is connected between the register 201*a* and the accumulator 41. Gates 264 and 265 similarly are employed in the path for supply of the successive F words, $F_0$, $F_1$ and $F_2$.

A control line 270 extends from the first output of the delay unit 242 to the AND gates 263–265. Thus, upon the application of the first pulse from the delay unit 242, the first two bits from the word $X_0$ are transferred into register 40 and the words $F_0$, $F_1$ and $F_2$ are each advanced one step with the word $F_0$ being placed in register 41. Thereafter, as each clock pulse on channel 271 is applied to all of the gates 251–262, the word $F_0$ is stepped downward through registers 41–41*k*. Concurrently, the bits 1–22 are moved into accumulator 40, two bits at a time.

The 12th pulse from counter 242 transfers the bits 23 and 24 into the accumulator 40 and simultaneously moves the word $X_1$ into register 200*a*. Coincident with the 14th output pulse from unit 240, a second pulse appears on output No. 1 to transfer the first two bits of the word $X_1$ into the positions 1 and 2 of accumulator 40. Simultaneously, a pulse appearing on line 271 actuates the gate 262 to transfer the word $F_0$ back into accumulator 41. The divide-by-14 unit 241 then applies a pulse by way of channel 272 to the gates 263, 264 and 265 to transfer the word $F_1$ into accumulator 41 simultaneously with the transfer of the word $F_0$ into accumulator 41*a*.

It will be noted that line 270 is connected to gates 263, 264 and 265 by way of an AND gate 273 and that line 272 is connected thereto, in parallel, by way of gate 274. A latch 275 has its trigger input connected to line 270 so that only the first pulse from the counter 242 will be applied by way of AND gates 273 to the gates 263–265. Thereafter, only the pulse from line 272 will be applied through the AND gate 274 to gates 263–265.

From the foregoing it will be seen that the operation diagrammatically illustrated in Table 1 is implemented by the selective use of clock control pulses from the master clock unit 240. By initialization, all of the accumulators 40 and 41*a*–411 are set to zero. The bits of the X words are moved into the accumulator 40 two at a time. On a first cycle, the word $F_0$ is stepped through the accumulators 41–411. Thus the word $F_0$ passes through the series of accumulators unaccompanied by any other word.

On the second cycle, during which the word $X_1$ is moved into accumulator 40 in place of the word $X_0$, the words $F_0$ and $F_1$ are stepped sequentially through the accumulators 41–411. As the third word $X_2$ is placed in the accumulator 40, the words $F_0$, $F_1$ and $F_2$ are stepped one after another through accumulators 41–411. Thus, the operations correspond with those indicated in Table 6.

It will be recognized that the storage unit 56*b* of FIG. 4 has not been included in FIG. 6. Further, it will be understood that the accumulator 43 of FIG. 4, and the data paths leading therefrom have not been shown in FIG. 6. FIG. 6 primarily serves to illustrate the control of the flow of data relative to the registers 40 and 41. It will be understood that gates will be actuated simultaneously with the gates 251–262 in each of the lines 43*a*, 43*c* and 43*b*, FIG. 4, so that the data will flow in the third path concomitantly with the flow in accumulators 41–411 as above described. Gates will also be provided in lines 45*c*, 45*b*, 45*d* and 49*a* and similarly in each of the interstage locations in the third path. Thus, by the use of partial adders, a significant saving in time is achieved.

Having described the invention in connection with certain specific embodiments thereof, it is to be understood that further modifications may now suggest themselves to those skilled in the art and it is intended to cover such modifications as fall within the scope of the appended claims.

What is claimed is:

1. A digital system for multiplying each data word of a first series $(F_{n,n=a,b})$ by data words of a second series $$\left(X_{n+m,\ n=a,b \atop m=c,d}\right)$$

to form a third series $(Y_{m,m=c,d})$ wherein each data word of said third series is of the general form $$\sum_{n=a}^{b} F_n X_{n+m}$$

without intermediate storage of any partial product, comprising:

(a) means for circulating a train of partial data words constituting said third series in the form of coded electrical bits in a single continuous flow path having a plurality of stages wherein each stage represents an electrical operation point at which the data word at that point may be modified;

(b) a digital multiplier in each of said stages;

(c) a digital adder in each of said stages with said flow path passing through each said adder and connected to the output of the multiplier associated with a given stage for forming a summation word from the product word from each said multiplier and the data word contained in said given stage;

(d) means for introducing the successive data words of said first series and coded electrical bits as partial words of said second series to said multipliers in synchronism with passage of data words of said third series through said path for combining the output of a given adder with the partially formed data word of said third series at that stage; and (e) an output for extracting the completed data word of said third series from the last stage of said path.

2. The system according to claim 1 wherein each said digital multiplier includes a logic circuit having one set of input channels individually connected to receive all bits of said words of said first series and each having a set of three input channels individually connected to receive three bits of each word in said second series where one channel in each given one of said set is common to a first pair of said sets and a second channel in each said given one of said sets is common to a second pair of said sets.

3. The system according to claim 1 wherein each of said digital multipliers includes a plurality of three bit look ahead, two bit shift logic circuits, each having one set of input channels individually connected to receive all bits of said words of said first series and each having a set of three input channels individually connected to receive three bit positions of each word in said second series where two channels in each said set are each common to two different pairs of sets.

4. The system according to claim 1 wherein means are provided for introducing bits of words of said second series in sets of two bits sequentially and wherein means are provided for introducing all bits of a given word from said first series simultaneously.

5. The system according to claim 1 wherein a closed loop is formed by a plurality of accumulators each having one output connected to one input of one of said multipliers and wherein means are provided for clocking data words of said first series through said loop.

6. The system according to claim 1 wherein a multi-bit accumulator is provided for receiving words of said second series wherein means are provided for forming words from said second series into said multi-bit accumulator, two bits at a time, and wherein signal channels extend from bit positions on said multi-bit accumulator to said multipliers in sets of three where one channel of each given set is common to a pair of sets and wherein another channel of said given set is common to a different pair of sets.

7. In a system where electrically coded multi-bit digital words are separately stored in two time series and are to be employed to form a physical representation of the convolution of said two series, the combination which comprises:

(a) a chain of operating accumulators each adapted to receive one of said words of said first series;

(b) a single accumulator adapted to store digital bits therein representative of one of said words of said second series;

(c) clock-actuated means for transfer of a sequence of words of said first series to move words stepwise from one accumulator in said chain to the next;

(d) a plurality of multipliers, one of which has inputs for receiving all bits from one accumulator in said chain and inputs for receiving a predetermined subset of the bits from said single accumulator where each multiplier receives at least one bit from said single accumulator which bit is also received by another multiplier, for producing a plurality of partial product signals;

(e) a chain of product accumulator stages in number exceeding by one the number of said multipliers with a partial adder connected to a multiplier and interposed between each pair of accumulator stages in said chain;

(f) means to cause repeated entry of a new word into said chain of accumulators from said first series after actuation of the last of said multipliers by the last word in each said sequence where said sequence increases by one word for each passage through said chain until the words in said train equal the number of said multipliers; and (g) means for injecting bits of words from said second series into said single accumulator two bits at a time in synchronism with said clock-actuated means.

8. The system of claim 1 wherein the members of said first series exceed the number of said multipliers and wherein storage means are provided in said flow path between the last stage and the first stage thereof.

9. In an operation for forming a physical representation of the convolution of two digitally coded electrical time series, where the first series cyclically is reproduced for said operation and where words of the second series are reproduced one per cycle of said first series, the method which comprises in an automatic data processing machine:

(a) concurrently forming in response to each of a train of clock pulses digital electrical signals representative of the respective partial products of (i) each of a plurality of words in said first of said series, and (ii) a like plurality of sets of bits of a sequence of words in said second of said series where each said set of bits has at least one bit common to at least one other set;

(b) in response to each clock pulse forming digital signals representative of the sums of said partial product digital signals; and (c) altering each digital signal representative of one of said sums in dependence upon the next partial product signals.

10. In digital multiplication of a pair of time series for convolution thereof, the method which comprises in an automatic data processing machine:

(a) concurrently forming in response to each of a train of clock pulses a first set of partial products between (i) a set of successive words of one of said series, and (ii) selected bits from a plurality of words from the other of said series where there is at least partial duplication between certain words of said second series of words, (b) concurrently forming in response to each said clock pulse a second set of partial products between (i) a second set of successive words of said one of said series, and (ii) said selected bits, and (c) successively separately summing the partial products involving a given word of said first series to eliminate the effect of said duplication.

References Cited

UNITED STATES PATENTS

| | | | |
|---|---|---|---|
| 3,023,966 | 3/1962 | Cox et al. | 235—181 |
| 3,308,283 | 3/1967 | Thornton | 235—164 |
| 3,327,103 | 6/1967 | Bonnet | 235—164X |
| 3,407,290 | 10/1968 | Atrubin | 235—164 |

FOREIGN PATENTS

| | | | |
|---|---|---|---|
| 1,001,096 | 8/1965 | Great Britain | 234—181 |

OTHER REFERENCES

Singleton, H. E., a digital electronic correlator, Proceeding of the I.R.E., December 1950, pp. 1422–28.

MALCOLM A. MORRISON, Primary Examiner

C. E. ATKINSON, Assistant Examiner

U.S. Cl. X.R.

235—181; 340—15.5